United States Patent [19]
Calvert et al.

[11] Patent Number: 5,287,505
[45] Date of Patent: Feb. 15, 1994

[54] ON-LINE PROBLEM MANAGEMENT OF REMOTE DATA PROCESSING SYSTEMS, USING LOCAL PROBLEM DETERMINATION PROCEDURES AND A CENTRALIZED DATABASE

[75] Inventors: Nathaniel Calvert; John J. Eakins; Earl W. Emerick; David L. Johnston; John L. Koehler; Gerald P. Miller; James R. Morcomb; Beau T. Sinclair; George B. Scarborough; Sandra D. Westling, all of Rochester, Minn.

[73] Assignee: International Business Machines Corporation, Armonk, N.Y.

[21] Appl. No.: 20,187

[22] Filed: Feb. 16, 1993

Related U.S. Application Data

[63] Continuation of Ser. No. 169,516, Mar. 17, 1988, abandoned.

[51] Int. Cl.[5] .............................. C06F 15/40
[52] U.S. Cl. ..................... 395/600; 395/200; 395/575; 371/11.3; 371/18; 364/221.7; 364/221; 364/275.7; 364/275.1; 364/274; 364/266.5; 364/265; 364/267; 364/DIG. 1
[58] Field of Search ....... 395/200, 575, 600; 364/DIG. 1, DIG. 2; 371/11.3, 18

[56] References Cited

U.S. PATENT DOCUMENTS

| | | | |
|---|---|---|---|
| 3,958,111 | 5/1976 | Hackett | 364/200 |
| 4,310,896 | 1/1982 | Cutler et al. | 364/900 |
| 4,425,625 | 1/1984 | Seligman et al. | 364/900 |
| 4,517,468 | 5/1985 | Kemper et al. | 364/492 |
| 4,654,852 | 3/1987 | Bentley et al. | 364/900 |
| 4,701,845 | 10/1987 | Andreasen et al. | 364/200 |
| 4,823,343 | 4/1989 | Takahashi | 364/200 |
| 4,866,712 | 9/1989 | Chao | 371/5.1 |
| 4,868,763 | 9/1989 | Masui et al. | 364/513 |
| 4,884,218 | 11/1989 | Agnew et al. | 364/513 |

FOREIGN PATENT DOCUMENTS 0068108  1/1983  European Pat. Off. .

OTHER PUBLICATIONS

Nachrichten Elektronik & Telematik, vol. 40, No. Spec. 2, Oct. 1986, pp. 45-46; "PC Checkt PC" (translation submitted herewith).

*Primary Examiner*—Lee C. Thomas
*Assistant Examiner*—Maria N. Von Buhr
*Attorney, Agent, or Firm*—Andrew J. Dillon

[57] ABSTRACT

Automated problem analysis and resolution of a customer data-processing system uses a central service data-processor system communicating with the customer system and having a data base for converting machine, software, and symptom data into instructions, hardware and software module lists, and service call schedules. The customer system detects data concerning its own configuration and problem symptoms for communication to the service system. The service system itself orders repair modules, and electronically communicates software fixes to the customer system.

13 Claims, 4 Drawing Sheets

ON-LINE PROBLEM MANAGEMENT OF REMOTE DATA PROCESSING SYSTEMS, USING LOCAL PROBLEM DETERMINATION PROCEDURES AND A CENTRALIZED DATABASE

This is a continuation of application Ser. No. 07/169,516, filed Mar. 17, 1988, now abandoned.

BACKGROUND OF THE INVENTION

The present invention relates to electronic data processing, and more specifically concerns systems and methods for on-line resolution of problems in a customer system by a remote central service system.

Servicing midrange and mainframe data-processing systems is a major segment of the data-processing industry. A manufacturer may employ as many people for repair and service as for sales or for development of new systems. Servicing requires extensive networks of service representatives, parts inventories, software, and physical facilities. Ironically, the servicing of data-processing systems relies heavily on human labor and mental effort.

U.S. Pat. No. 4,654,852 to A. M. Bentley et al. proposes one step toward more automated repair of data-processing systems. That patent allows an operator to run problem-determination procedures (PDPs) stored in the system itself. The PDPs can themselves determine which components are present in the system and run tests against them, using the results of previous tests to determine which PDPs to run next. These PDPs can also request the operator to perform actions, such as setting controls, disconnecting cables, and restarting programs. The PDPs propose problem solutions as messages to the operator recommending that certain actions be taken, or that certain service representatives be summoned.

A centralized service data-processing system has also been established, for example, the IBM "RETAIN" network has been available for many years. A customer can telephone the nation-wide facility and relate a problem on his system to a service representative, either a customer engineer (CE) or product support staff. The representative attempts to diagnose the problem by asking the customer what symptoms his system experiences, and what hardware and software components are present on the system. As the customer answers these questions, the service rep enters certain key words into a terminal. When he is satisfied that he has sufficiently characterized the problem, the rep accesses one or more problem-management data bases (PMDBs) stored in the central system, using the key words as search arguments. Each entry in the data base has one or more key words and descriptions of proposed solutions for problems involving those key words.

These solutions are of three general types: instructions to perform some action with respect to the customer system, a list of possibly failing hardware components to be replaced, and a list of possibly failing software components for which program temporary fixes (PTFs) exist. Microcode fixes (MCFs) are frequently considered to be hardware, but may for the present purpose be grouped in a common category with software PTFs. The representative reads the entries matching the particular key words he has entered, and may schedule a service call by a customer engineer; he may also order out the necessary hardware and software components for the CE to take with him.

SUMMARY OF THE INVENTION

The present invention achieves another milestone in automated servicing of data-processing systems. A number of hardware and software facilities in a customer data-processing system and in a central service system linked by an integral communications facility cooperate to establish a continuous sequence from the occurrence of a problem in a customer system all the way to resolution of the problem and in some cases to automated delivery of the means for solving the problem.

The system components are designed for problem detection and isolation at the time of failure. This emphasis on data capture at the time of first failure avoids the need for failure-recreation techniques, which are expensive and which often fail to detect and isolate intermittent errors. The invention also captures the hardware and software configuration and usage at the moment of failure. This allows easier identification and diagnosis of environment-related problems.

The system of the invention can handle a wide variety of functions. A customer can, for example, report problems which he perceives, even though his system has not detected any malfunction. Problems can be reported for products which are not supported by the central service facility. Human intervention is possible during resolution of the problem at the central facility, in case the problem has not occurred previously or is not sufficiently well defined. Service calls by several different types of support personnel can be scheduled and parts can be ordered automatically for these calls. Where a repair can be effected by the customer himself without any replacement parts, repair instructions can be communicated to him in real time for quick action. Where a repair requires only software (or microcode) modules, the modules themselves can be identified, compared with modules the customer already has, and transmitted electronically over the same medium the customer uses to communicate with the service system. Recurring problems can be flagged, so that an incorrect repair action can be identified easily. Other advantages, as well as modifications obvious to those skilled in the art, will become apparent in the description of the preferred embodiment.

Broadly, the invention includes a customer data-processing system having a resource manager, error-detection means, a problem log, a problem-determination driver, and a service support facility; it further includes a central service data-processing system having a problem-analysis means using a data base responsive to entries from the problem log; it further includes a communications medium for transmitting data from entries of the problem log from the customer system to the central system, and for communicating results back to the customer system. When the error-detection means finds a problem, it generates a problem-log entry along with information from the resource manager. The support facility sends problem-log data to the central service system for conversion into a solution to the problem resulting in instructions to the customer, lists of repair parts, service-call schedules, and/or the actual transmission of software directly to the customer.

DESCRIPTION OF A PREFERRED EMBODIMENT

Figure 1:
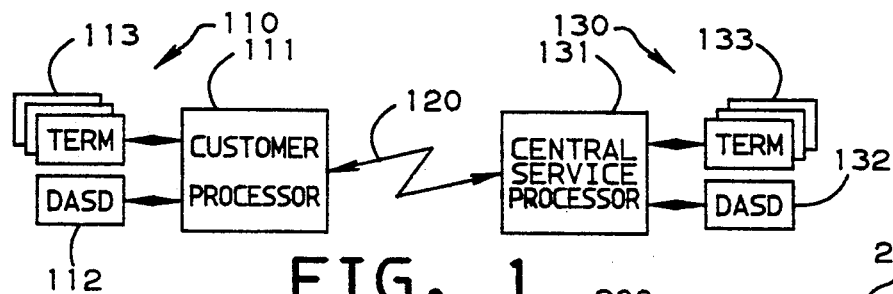
FIG. 1 shows data-processing systems serving as an environment for the present invention.

FIG. 1 shows the environment 100 of the present invention. A customer data-processing system 110 is located at a customer premises. This system includes a conventional processing unit 111, storage devices (DASD) 112, and a number of conventional display terminals 113 for displaying data to an operator and for receiving data from the operator. System 110 may also include other conventional peripheral or input/output (I/O) devices, not shown.

A conventional telecommunications link 120 links customer system 110 to other systems, using a public switched telephone network or other carrier.

A central service processing system 130 is linked to a large number of customer systems such as 110, via telecommunications link 120. System 130 is run by a manufacturer or maintenance organization; one such service system may communicate with thousands or even hundreds of thousands of customer installations covering entire countries or regions of countries. System 130 may include one or more conventional processing units 131, conventional storage devices 132 for holding programs and data bases, and conventional terminals 133 for displaying data to service personnel and for receiving data from such personnel. For the purposes of the present invention, one terminal (or one group of terminals) in a typical service system may be physically located in a country-wide dispatch center (or in regional dispatch centers) which schedules CE calls to customer locations. Another group of terminals may be located in product support centers whose function is to provide assistance with different hardware or software products. Another terminal (or group) may be used in code-distribution centers which load and package code modules for program temporary fixes (PTFs) for solving software and microcode problems for various customer systems and program products. (A separate term, microcode fix (MCF), is used for microcode; however, the term PTF will be taken to include MCFs as well.)

All of the components shown in FIG. 1 are conventional, and serve as the environment for practicing the present invention.

Figure 2:
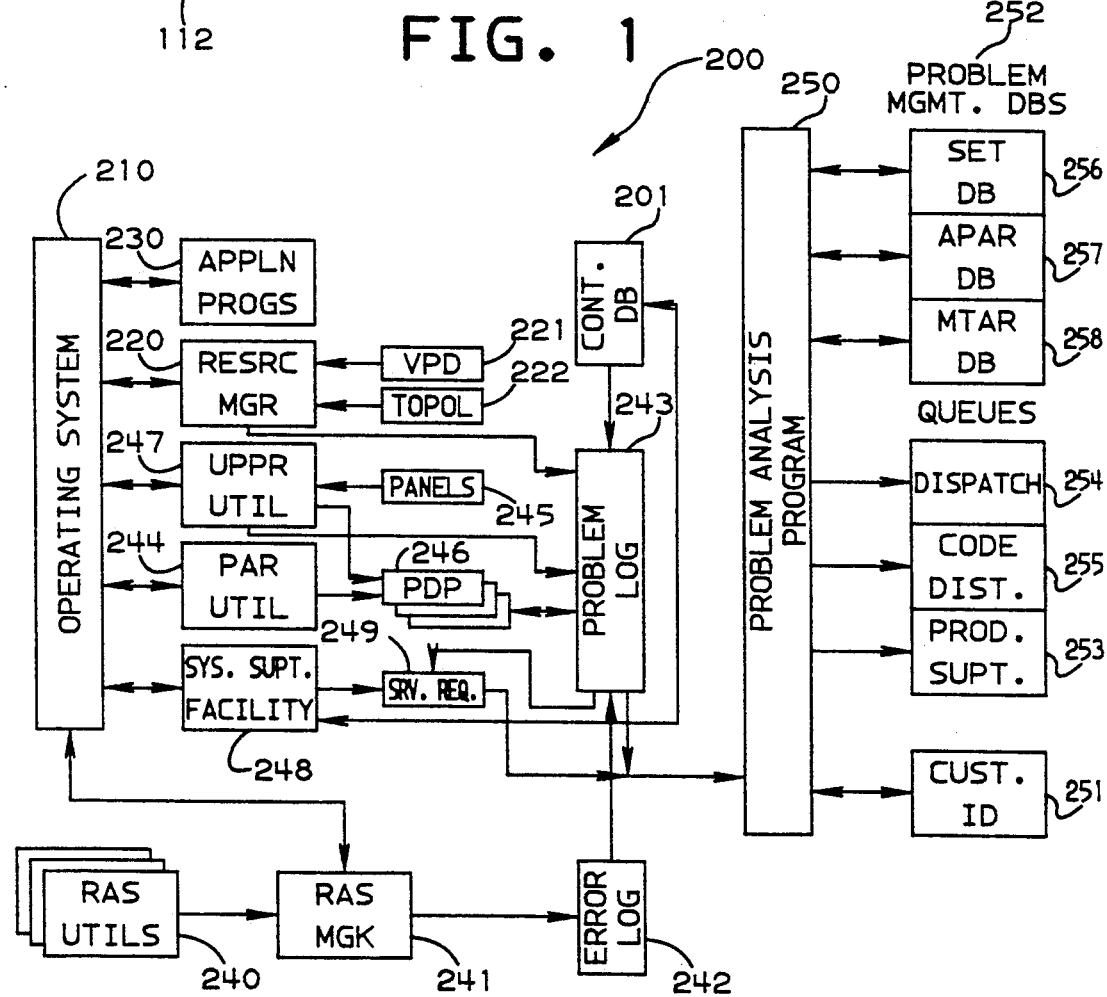
FIG. 2 shows program components used in the invention.

FIG. 2 shows the software elements 200 involved in practicing the invention upon the hardware of FIG. 1. Some of these elements are entirely conventional, some are new, and some are conventional but have added functions for carrying out the invention.

Operating system program 210 may be of any type, but preferably has the conventional capability of executing a number of programs concurrently. A resource manager (RM) program 220 maintains vital product data (VPD) information from a VPD table 221 identifying the hardware components (types, models, serial numbers) and the software components (product numbers, release levels, PTFs installed); some of this data is actually collected by RAS manager 241. The RM program also maintains a topology file 222 which describes the interconnections of the components of the customer system. Maintenance of such configuration data describing a data-processing system is set out in U.S. patent applications Ser. No. 122,293, filed Nov. 18, 1987 by Calvert, et al., now U.S. Pat. No. 5,237,688, and in Ser. No. 122,295, filed Nov. 18, 1987 by Allen, et al., now U.S. Pat. No. 4,916,637, both of which are incorporated herein by reference.

Application programs 230 of any conventional type are executed by operating system (OS) 220 under any conventional management technique, such as a job queue (not shown). The operating system runs RM program 220 at bring-up (IPL) time, as one job among the application programs 230.

A suite of service utilities include most of the elements used by the invention.

The subsystems of the customer system all have resident event-driven reliability and serviceability (RAS) utility programs which detect any errors occurring during operation of their subsystem. For example, an I/O processor in a disk subsystem such as 112, FIG. 1, may have a utility 240 running as an interrupt routine whenever the I/O processor issues an interrupt resulting from an error; they may also run as notifiable tasks. An error may occur when an operation produces a known invalid result, times out, fails to start, produces a stuck fault in a bus line, etc. A reliability and serviceability (RAS) manager 241 is event-driven by utilities 240 while the customer system is running. Rather, than running at the level of a job under OS 210, RAS manager 241 preferably executes as an event-driven task in microcode. Raw error data collected by the RAS manager is kept in an error log 242; some of this data is later transferred to a problem log 243. Data collected from each error is recorded as an entry in the error log. The fields of each entry include:

A system log identifier, a unique key identifying this error-log entry

Failure statistics (e.g., how many times did a seek error occur before the correct cylinder was found?)

The configuration of components (from the VPD table) involved when the error occurred Device status provided by the particular RAS utility, such as register contents or status bits A reference code identifying the type of error.

Problem log 243 contains a number of entries, one for each problem encountered. (Note that an "error" is different from a "problem.") Each entry contains fields for:

Control information (such as length and status)

Machine information (such as type and serial)

Initial or point-of-failure FRU list, in order of decreasing probability

Isolation FRU list, in order of decreasing probability

Final or fix FRU list, in order of decreasing probability

Symptom string (coded reference numbers)

Messages (in the form of codes to separate message table entries)

Fixes for program problems (PTF numbers)

A problem-log entry may have one of four status conditions: "open," after the entry is first built at block 334, FIG. 3; "ready," after all applicable PDPs 246 have finished executing at block 420, FIG. 4; "prepared," after the associated service request 249 has been stored in it at block 440, FIG. 4; and "sent," after block 515, FIG. 5, has transmitted it to the central service system for action.

The term "FRU" literally stands for "field replaceable unit," the smallest component of a system which will be stocked for replacement of a failing component, and is in common use in the industry. In the context of the present invention, however, the meaning of this term is expanded to refer to the smallest unit of a problem solution. Such a unit may be a hardware component as in the usual sense of the term, but may also be a software component such as a program or a module, or a message indicating an action to be taken to solve the problem. For example, the operator might be instructed to reset certain switches, or to summon a communications-carrier service representative.

The initial FRU list is the list of components suspected of failing by the RAS utility 240 which detected the problem; this list is derived from the error log entry written by this RAS utility. The isolation FRU list contains the components suspected by the PDPs 246; any PDP executed by PAR program 244 may write one or more FRU numbers into the isolation FRU list field in the problem-log. The service system updates the isolated FRU list to produce a final FRU list which designates the suspected components. The FRU code numbers in each of these three lists are ordered in decreasing order of probability of failure by the program which supplies them; each item in the list also has an explicit probability number which estimates the likelihood that it is the failing unit; again, these numbers are provided by the designers of each component. The orders of the initial and isolated FRU lists are chosen by the designers of the RAS utilities and PDPs, and may be modified by the service-system data bases; they involve no algorithm or intelligence on the part of the program, although it would be within the scope of the invention to build a conventional diagnostic capability into one or more of them. The PDPs do have some diagnostic capabilities, however, as explained in the aforementioned patent to Bentley, et al. Different fields of a problem-log entry are written at different times, and more than one entry of some fields may be written into a single entry.

A contact data base 201 contains information relating to the customer, such as the customer name and address, the name and telephone number of one or more people who are to be contacted in connection with system problems, preferred language for PTF cover letters, and so forth.

A problem analysis and resolution (PAR) program 244 contains routines for analyzing problems received by the RAS manager and entered into the error log. When RAS manager 241 creates a new entry in error log 242, PAR program 244 may—but need not always—create a new entry in problem log 243. The system log identifier, the reference code identifying the failure, and some of the configuration data from the error log are transferred to the problem-log entry. The PAR program also selects among a number of problem determination procedures (PDPs) 246, in response to reference codes in the problem log. Briefly, PAR 244 reads the coded reference numbers from the problem-log symptom fields, and the failing-unit codes from the problem log. It then selects a particular PDP 246 and executes it. The selected PDP may interrogate further fields in the problem-log entry, ask the operator of the customer system for further information (by means of a display on a terminal 113, FIG. 1), or display instructions for the operator to perform certain actions, such as setting controls or plugging cables. PDPs 246 are described in commonly assigned U.S. Pat. No. 4,654,852 to A. M. Bentley et al.; this patent is incorporated herein by reference.

A user-perceived problem resolution (UPPR) program 247 allows the operator of the customer system to create a problem-log entry even though the RAS manager has not detected any errors. This is done by means of display screens or panels 245 requesting information from the operator and receiving his input. The UPPR program may run certain PDPs 246 in response to data from the operator, and may also request the operator to take certain actions; it builds a symptom string and list of involved components from the PDP results and the operator information. In some cases, a PDP executed for this purpose may solve the problem; in that case, no entry is created.

A system support facility (SSF) program 248 converts a selected problem-log entry into a service request 249, transmits it to the central service system 130, FIG. 1, and manages the customer-system end of a dialog with the service system.

A service request 249 is a request for hardware service or for software service, depending upon the type of problem in the selected problem-log entry. Hardware and software requests are identical except for the value of a flag in the control field. A service request 249 has fields for:

Control information (length and type of request, service log identification number Customer data (name, telephone number, and address of contact person, customer language Machine information (type, serial, model, change level)

Problem data (problem-log number, date and time of occurrence, severity, symptom-code string, recurrence flags)

Initial and isolation FRU codes (i.e., part numbers of field or customer replaceable hardware and/or software components, probability estimates that these components caused the problem, key number of a message describing the problem).

Recurrence flags are set to indicate that the same machine or software product has previously reported a problem within a certain time period (e.g., 30 days), and that the same symptoms had previously occurred within the time period. The severity code is a number assigned by the operator to indicate how serious he believes the problem to be. The symptom string is a series of codes reformatted from the results of problem detection and subsequent problem analysis.

At the central service system, problem analysis program (PAP) 250 manages the dialog with the customer system, accesses a customer data base 251 and a set of problem-management data bases 252, and enters orders into three sets of queues: product support queues 253 physically located at various product support centers for handling information for or problems with specific hardware or software products, dispatch queues 254 located at service centers, for informing service personnel (CEs) to be sent to customer locations, and code-distribution queues 255 for shipping PTF packages to customer locations. Although the problem-management data bases 252 may be conceptually considered to be a single data base, they are actually implemented as three separate entities, each having the same access or key fields, but different result or output fields. The key fields represent symptom strings formatted as reference codes designating FRUs, and designating the number and exit point of a PDP 246. The symptom exception table (SET) 256 contains entries for hardware components only; its output fields specify FRU numbers of hardware components suspected of failing, as well as probability estimates that the associated FRU did in fact fail. APAR table 257 contains entries for software components only; its output fields specify PTF numbers for program products for replacing certain code in the customer's system. (As a matter of policy, whole modules are replaced rather than being patched; it would be possible, however, to specify code patches in the output fields.) MTAR table 258 is the same as APAR 257, but contains fixes for microcode only (i.e., MCF numbers). PAP 250 is in this incarnation an application written in the publicly available Customer Information Control System (CICS) product; the data bases are preferably implemented using the publicly available DB2 product.

Figure 3:
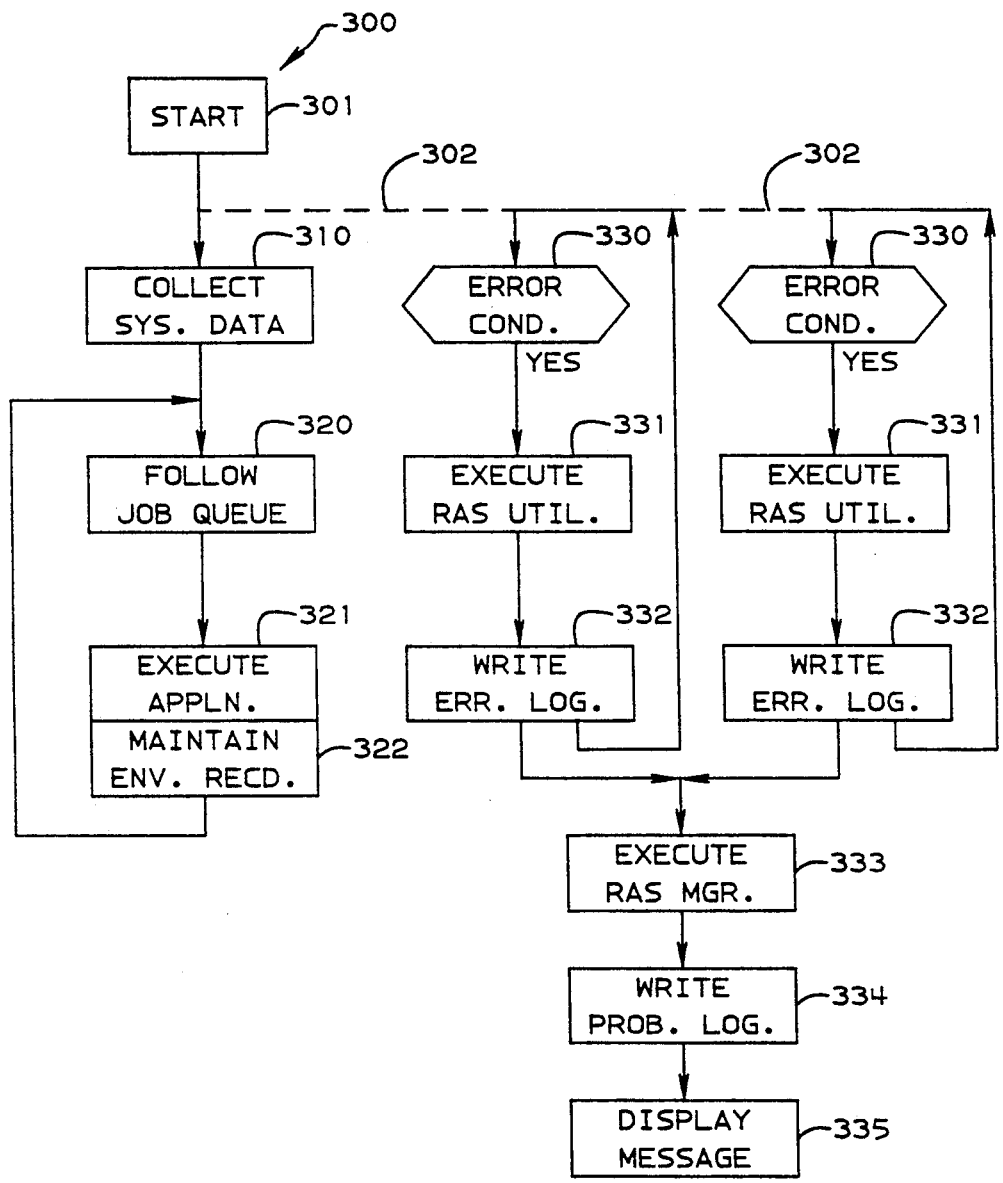
FIG. 3 shows a problem-detection procedure.

FIG. 3 is a flowchart 300 of the process of detecting errors in customer system 110, FIG. 1.

When the customer system 110 is first brought up at block 301, OS 210 causes RM program 220, using RAS manager 241, to collect system data at block 310. As described in the above-mentioned patent applications, hardware and software components of system 110 contain within themselves "vital product data" (VPD) which can be read out to identify their part numbers, engineering-change levels, program-code levels, and so forth. This data includes a type number, model number, and serial number for the system as a whole. The RM program reads VPD information from each component, and stores it in a VPD table. This table is stored with a system resource manager (SRM) data base or topology file describing how the components are connected together; this data may be derived from a conventional configuration program (not shown) executed whenever the customer reconfigures or expands his system.

Operating system 210 then follows 320 a conventional job queue to execute 321 system tasks. Some of these tasks may run concurrently with other tasks in the queue. As each task is executed, OS 210 maintains an environment record 322 describing the task being run and the state of the system.

During this time, as represented by the dotted lines 302, the RAS utilities 240, FIG. 2, are capable of executing in their own components. Whenever an error condition occurs within a component, block 330 causes the appropriate RAS utility to execute at block 331. When the utility determines the nature of the error, by reading status bits, performing tests, etc., it writes 332 an entry in the error log. Error-log entries have been described in connection with FIG. 2. The FRU list derived from the error-log entry is a series of codes with attendant probabilities that the associated FRU (that is, a hardware or software component, or a message code designating an action to be taken) actually did cause the error. Control then returns to block 330 in the utility which had written the error-log entry. Whenever a utility has written an entry in the error log, the event-driven RAS manager 241 executes at block 333.

If the error is significant, block 334 creates a new entry in the problem log, and writes into this record the data described in connection with FIG. 2, including the initial FRU list, obtained from the error log. Because no diagnosis or other analysis has yet been performed, this initial FRU list is usually longer than the isolation FRU list yet to be written in the problem log. Block 335 then accesses a message (using a conventional language-selection utility in the system) and displays it to the system operator on his terminal 113, FIG. 1. The message notes the presence of a problem, but the RAS manager does not take any further action automatically. This program could, however, be easily modified to proceed by itself to the problem-determination stage of FIG. 4, or to allow the operator to select such an automatic mode.

Figure 4:
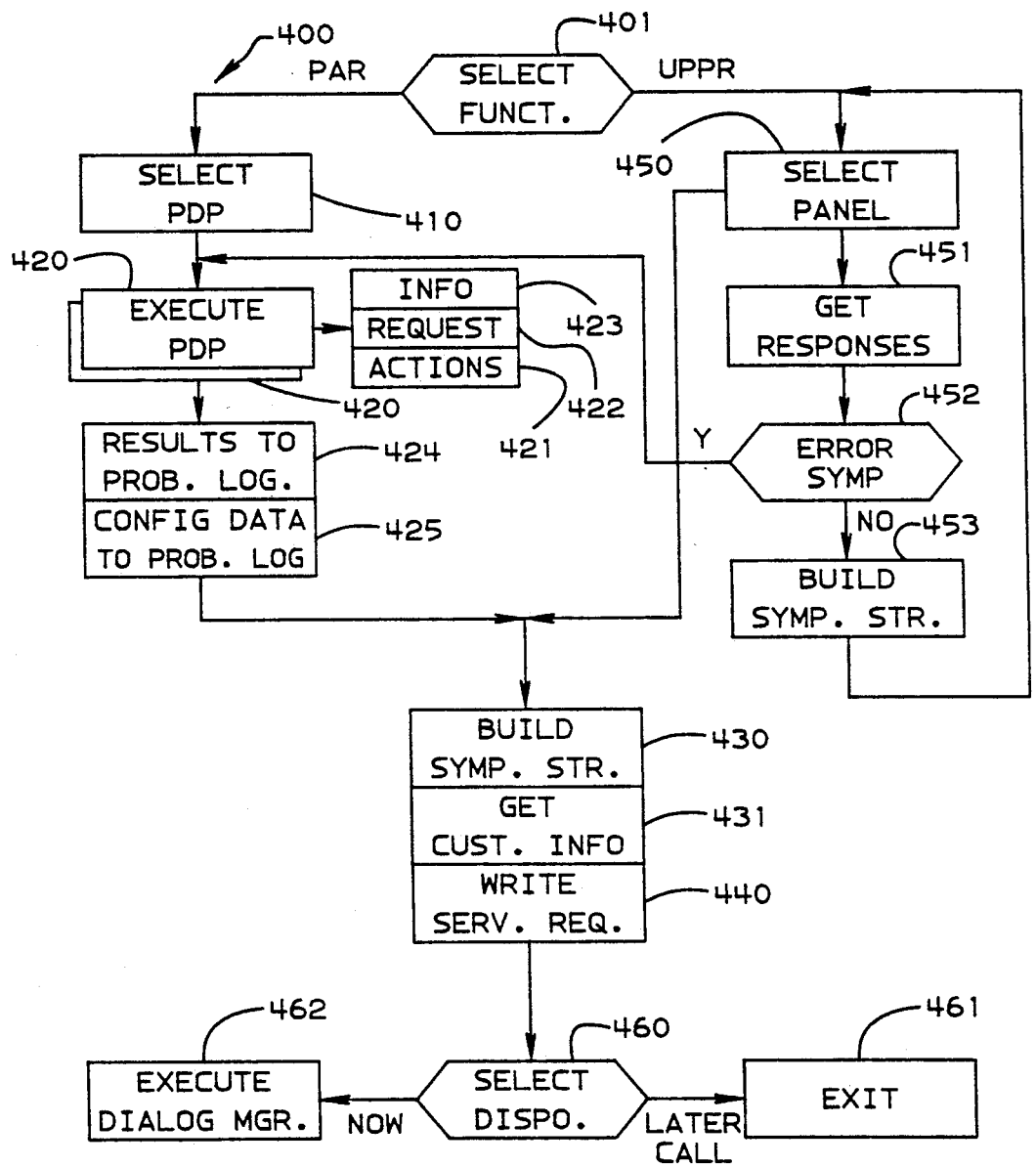
FIG. 4 shows a problem-determination procedure.

FIG. 4 is a flowchart 400 showing the process of problem determination. In this embodiment, an operator at the customer system 110 manually initiates the process; it could, however, be started automatically as indicated above.

Block 401 receives a command from the operator of the customer system via a terminal 113, FIG. 1. The operator may enter a command or press a defined function key to select a system-detected problem after viewing the message selected by step 334, FIG. 3, or after viewing the problem log in a conventional manner. If more than one problem has been detected, he may select one particular entry from the problem log for analysis. The process of determining a problem detected by the system itself is called problem analysis and resolution (PAR).

Control then proceeds to block 410, where the PAR program 244 selects a particular PD procedure 246 according to the codes in the initial FRU list of the selected (or the first) problem. The selected PD procedure 246 executes at block 420. During its execution, it may display 421 one or more screens requesting the operator to perform an action, such as setting a control or disconnecting a cable, so that a test can be performed under certain conditions. Procedure 246 may also display 422 screens which request information from the operator. This information may, for example, include the state of certain indicators in system components, if the PD procedure cannot read them directly. Further screens may display 423 merely advisory information concerning, for example, the progress of the tests being conducted. One of these messages may state that the problem has been solved by action taken by the PDP or the user. PDPs have access to the configuration data of the system, and they can cause other PDPs to execute, as indicated at 420'. The explicit result of a PDP is one or more codes specifying a FRU, along with a failure probability. PDPs are diagnostic routines employing decision trees controlled by the results of tests and/or operator input.

The foregoing steps are conventional in themselves, and are more fully described in the cited U.S. Pat. No. 4,654,852. Block 424 writes into the problem-log entry the results of the tests performed by the selected PD procedure. More specifically, the isolation FRU list field of the problem-log entry receives reference codes representing the most probable failing FRUs, along with a code designating the identity and the exit point of the last PDP to execute. Block 425 writes into the problem-log entry certain VPD codes relevant to the problem, such as the model and serial number of the customer system. The status of the problem-log entry changes to "ready" at this time.

Block 430 converts the isolation FRU list from the problem-log entry into a symptom string by selecting the two most likely failures from the isolation FRU list, reformatting them, and adding a code designating whether the most likely failure is hardware or software, and the code indicating the PDP identity and exit point. Block 431 obtains customer information, either from contact data base 201, FIG. 2, or from the operator, should he decide to override the data-base information. This information includes the name and telephone numbers of the person to contact at the customer site, and also includes a severity code for the problem. This code is assigned by the operator to indicate the urgency for resolving the problem. Block 440 then writes the actual service request into the problem-log entry, according to the format described in connection with FIG. 2. (If the request comes from the UPPR process rather than from PAR, the FRU list is in the form of a sequence of key words, rather than numeric reference codes, however.) At this point, the status of the problem-log entry is "prepared."

Instead of selecting the PAR process at block 401, the operator may decide that the customer system has a problem even though it has not itself detected any problem. He selects this user-perceived problem resolution (UPPR) process by another command or function key at his terminal.

In this case, block 450 selects and displays a panel requesting certain information from the operator. Block 451 accepts input data from the operator, and formats the operator's responses in terms of key words. Block 452 detects any system problem occurring during the UPPR process. If a problem is detected, control shifts automatically to the PAR process, executing block 420. If no error is detected, control passes from block 452 to block 453, which writes the key words from block 451 to a symptom string in the isolated FRU list field of a newly created problem-log entry for this problem, then returns to block 450, which then selects another screen, based upon the key words generated by responses to previous screens. The screens displayed by block 450 may request certain actions, ask questions about the system, and display advisory information in the same manner as in blocks 421-423. When block 450 determines that the problem has been sufficiently isolated, control passes to block 430 and the process continues as before.

The operator may then select a disposition for the current problem, at block 460. It is entirely possible that the problem identified in the current problem-log entry has been solved at this time; that is, one or more actions taken by the operator in response to messages from the initial or isolation FRU lists has cured the fault in the customer system. The operator may then exit the process at block 461. He may also exit if he decides to proceed by analyzing additional problems and sending them all at a later time, or by placing a voice call directly to a CE or product-support staff person. In that event, the service request remains in storage with a status flag set to a "prepared" status, indicating it is ready to transmit to the service system. If he elects to continue with problem resolution, block 462 invokes the dialog portion of the SSF program.

In terms of the components shown in FIG. 2, blocks 410-425 of FIG. 4 are performed by the PAR program 244, blocks 450-453 are performed by the UPPR program 247, and blocks 430-440 and 460-462 by SSF 248.

Figure 5:
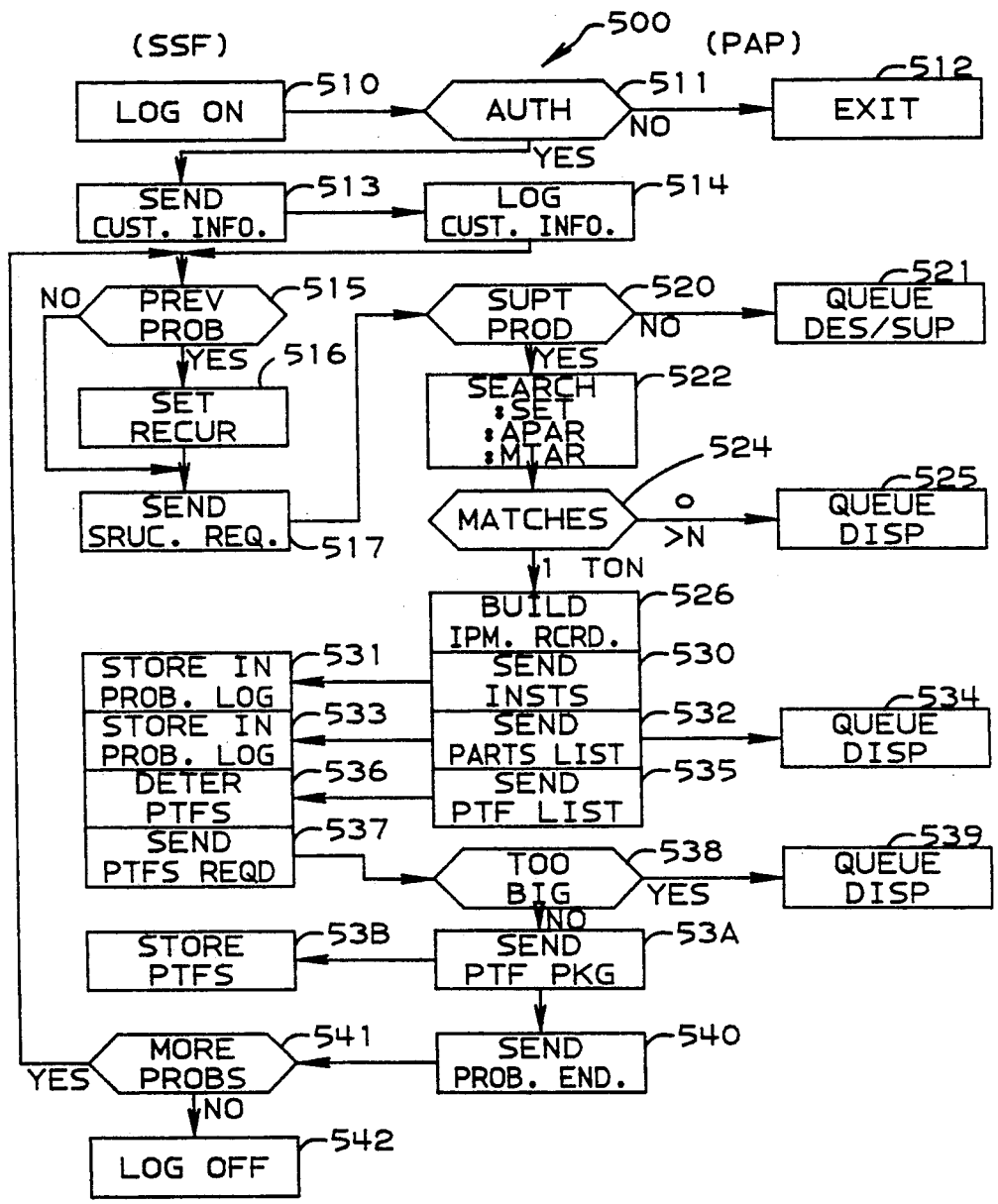
FIG. 5 shows a problem-resolution procedure.

FIG. 5 is a flowchart of a process 500 for managing a dialog between the customer system and the central service system for resolving problems. The blocks executed by SSF 248 in the customer system are shown at the left side of FIG. 5, while the blocks executed by PAP 250 in the central service system are shown at the right side.

The operator at the customer site logs on (block 510) to the service system with an identification. A conventional procedure 511 checks the authorization of this customer to use the facilities of the central system. If the customer is not authorized, block 512 ends the dialog. Otherwise, the central system acknowledges the logon and block 513 transmits the customer information from the contact data base. Block 514 logs the customer information for use in connection with all problems reported during the session. Block 515 checks all previous entries in the problem log for a recurring problem. A problem is recurring if another problem-log entry with in the previous thirty days had the same symptoms, or if the same component, at the same engineering or code level, of the customer system had reported a problem. If so, block 516 sets the recurring-problem flags of the service request for special handling by the service system. Block 517 then transmits the service request to the PAP at the service system. Blocks 510-517 thus constitute a procedure for obtaining information from the customer system for solving one or more problems in the latter system.

Block 520 inquires whether the product reporting the problem is supported by the data bases of the service system. If not, block 521 transfers the service request to a dispatch or support queue. Service representatives (CEs) and support-center personnel can view these queues for scheduling a visit or a telephone call to the customer.

If the product is supported, block 522 searches the problem-management data bases (PMDBs) for possible solutions to the problem. The first data base to be searched is the Symptom Exception Table (SET) 256, described in connection with FIG. 2. This table is for hardware problems; the name comes from the expectation that most hardware failures will be found by the PDPs 246 in the customer system—SET will thus find matches only for exceptional hardware problems. Next, block 522 searches the APAR data base 257 for software problems. Finally, the MTAR data base 258 is searched to resolve any microcode problems. Again, the search arguments to all three data bases are symptom strings formatted as reference codes designating FRUs, and designating the number and exit point of a PDP 246. The output fields specify FRU numbers and probabilities of hardware components, PTF numbers for program products, and MCF numbers for microcode. Also, as noted, when the service request comes from the UPPR process, the search arguments are key words rather than the codes from PAR; this difference is transparent to the data bases.

Block 524 reads the PMDB entries which match the search arguments. If no entries match, or if a large number (typically, more than ten) of entries match the search arguments, block 525 queues a record to a display 133 at a regional or national service center. This queue is viewed by CEs for scheduling a call or visit to the customer for resolving the problem. Finding no matches in the data base means that the problem has not been reported before; finding a large number of matches indicates that the problem has not been sufficiently well defined. In either event, human intervention is called for. Recurring problems are queued to a support center; these are identified by the flags discussed earlier.

For a reasonable number of matches, block 526 builds a problem-management record (PMR) specifying the solution for the current problem, in terms of a FRU list. For multiple matches, block 526 combines the FRU lists of all the matches. The PMR may contain one or more of the following types of information:

Instructions to the operator at the customer system to take some action to resolve the problem (e.g., reset a control, reconnect a cable, call a communications carrier service representative)

A list of part numbers identifying hardware components for installation by the customer or by a service representative A list of PTFs for resolving a software problem.

A problem-management record is built any time a new problem is reported, and is used, for example by blocks 521, 525, 534, and 539. Thus, blocks 520-526 define a process for converting data defining a problem (including system and symptom identifiers) into a specification of a solution of that problem. The specification, a PM record, may include particular actions to be taken, either by the customer or by a service representative, and may also include lists of items, software and/or hardware, required to be added to or replaced in the customer's system, either by the customer or by a service rep. That is, it contains a list of "FRUs" in the expanded sense of that term.

Block 530 sends any instructions from PMR 526 to the customer system, where block 531 adds them to the fix-FRU list field of the problem-log entry for the problem identified by the current service request. Block 532 transmits the list of part numbers for the failing hardware components (if any) to the customer system, where block 533 adds it to the fix-FRU list of the problem-log entry. Block 532 also sends the list of part numbers to block 534, which queues it to dispatch.

Block 535 transmits the list of PTFs (if any) to the customer system. Block 536 causes SSF to interrogate the VPD file 221 to determine which if any of these PTFs are already available in the customer system. Block 537 then determines which of the PTFs have not been installed on the customer system, and transmits a list of the required PTFs back to the service system. Block 537 also sends data indicating the language used in the customer system, since the PTFs are customized for different languages. If the size of the PTF package is greater than a threshold amount, block 538 sends the list to block 539, which queues a regional or national code distribution center to ship the PTFs to the customer. But, if the size of the PTF package is small enough to send electronically in a reasonable amount of time, block 53A accesses the required PTFs from disk storage 132 in the service system, and transmits them directly to the customer system over telecommunications link 120, FIG. 1. Block 53B receives the PTF package and stores it in the customer system for later installation by the operator.

Blocks 530-53B form a process for transmitting from the service system to the customer system a specification of a solution to the current problem, in the form of instructions and lists of hardware and/or software components for effecting repairs. If the repairs can be effected by software (or microcode), the actual PTF (or MCF) code itself can be sent directly, avoiding a service call or a package shipment. In any case, the hardware components and software elements required can be ordered out of inventory and service representatives scheduled for calls, all without human intervention.

Block 540 informs the customer system that the current service request has been satisfied. Block 541 then determines whether any additional service requests should be sent to the service system. If the operator had previously specified that all outstanding problems should be sent, the next problem-log entry is selected, and control returns to block 515. If only one problem was to be sent, or if the completed service request was the last problem in the log, block 541 logs off the PAP program, and may display a "done" message to the operator. Blocks 540-542, then, allow repetition of the preceding processes for multiple problems.

Problems resolved by the above process are retained in the problem log for a period of time, with their status set to "sent." It is these problems which are compared in block 515 with future problems to determine whether a problem has recurred. Any problems ready to send by the process 500 remain in storage with a status of "prepared," and may be sent by invoking process 500 at any time. Likewise, problem-log entries which have been analyzed but not prepared for transmission are stored for preparation at any time, and entries detected but not analyzed are stored as "open," and can be analyzed at the operator's convenience.

Having described a preferred embodiment thereof, we claim as our invention:

1. A method for automated analysis and resolution of problems in a computer system connected to a central service system, said method comprising the machine executed steps of:

in said computer system, detecting a problem in said computer system;

automatically executing a problem determination procedure to analyze said problem after said problem is detected by said detecting step;

said problem determination procedure generating a list of replaceable components of said computer system that may have caused said problem;

building a symptom string by appending an identification of said problem determination procedure to said list of replaceable components generated by said problem determination procedure;

building a service request by appending machine information about said computer system to said symptom string, said machine information uniquely identifying said computer system;

transmitting said service request to said central service system;

in said central service system, receiving said service request from said computer system;

searching a database for a matching database entry that matches said symptom string portion of said service request;

finding a matching database entry, said matching database entry containing an indication of a solution software component; and transmitting said solution software component to said computer system.

2. The method of claim 1, wherein said building a symptom string step further comprises appending an exit point of said problem determination procedure to said list of replaceable components generated by said problem determination procedure.

3. A method for automated analysis and resolution of problems in a computer system connected to a central service system, said method comprising the machine executed steps of:

in said computer system, detecting a problem in said computer system;

automatically executing a problem determination procedure to analyze said problem after said problem is detected by said detecting step;

said problem determination procedure generating a list of replaceable components of said computer system that may have caused said problem;

building a symptom string by appending an identification of said problem determination procedure to said list of replaceable components generated by said problem determination procedure;

building a service request by appending machine information about said computer system to said symptom string, said machine information uniquely identifying said computer system;

transmitting said service request to said central service system;

in said central service system, receiving said service request from said computer system;

searching a database for a plurality of matching database entries that match said symptom string portion of said service request;

finding a first matching database entry, said first matching database entry containing an indication of a first solution software component;

finding a second matching database entry, said second matching database entry containing an indication of a second solution software component; and transmitting said first and second solution software components to said computer system.

4. The method of claim 3, further comprising the steps of:

determining that said computer system already has said first solution software component; and disabling the transmission of said first solution component to said computer system.

5. The method of claim 3, further comprising the steps of:

finding a third matching database entry, said third matching database entry containing an indication of a first solution microcode component; and transmitting said first solution microcode component to said computer system.

6. The method of claim 3, further comprising the steps of:

finding a fourth matching database entry, said fourth matching database entry containing first textual information indicating how said problem can be solved; and transmitting said first textual information to said computer system.

7. The method of claim 3, wherein said building a symptom string step further comprises appending an exit point of said problem determination procedure to said list of replaceable components generated by said problem determination procedure.

8. An apparatus for automated analysis and resolution of problems in a computer network, comprising:

a computer system connected to a central service system, said computer system comprising:

means for detecting a problem in said computer system;

means for automatically executing a problem determination procedure to analyze said problem after said problem is detected by said detecting step;

said problem determination procedure having means for generating a list of replaceable components of said computer system that may have caused said problem;

means for building a symptom string by appending an identification of said problem determination procedure to said list of replaceable components generated by said problem determination procedure;

means for building a service request by appending machine information about said computer system to said symptom string, said machine information uniquely identifying said computer system;

means for transmitting said service request to said central service system;

said central service system further comprising:

means for receiving said service request from said computer system;

means for searching a database for a plurality of matching database entries that match said symptom string portion of said service request;

means for finding a first matching database entry, said first matching database entry containing an indication of a first solution software component; and means for transmitting said first solution software component to said computer system.

9. The central service system of claim 8, further comprising:

means for finding a second matching database entry, said second matching database entry containing an indication of a second solution software component;

means for transmitting said second solution software component to said computer system;

means for determining that said computer system already has said first solution software component; and means for disabling the transmission of said first solution component to said computer system.

10. The central service system of claim 8, further comprising:

means for finding a third matching database entry, said third matching database entry containing an indication of a first solution microcode component; and means for transmitting said first solution microcode component to said computer system.

11. The central service system of claim 8, further comprising:

means for finding a fourth matching database entry, said fourth matching database entry containing first textual information indicating how said problem can be solved; and means for transmitting said first textual information to said computer system.

12. The computer system of claim 8, wherein said means for building a symptom string further comprises means for appending an exit point of said problem determination procedure to said list of replaceable components generated by said problem determination procedure.

13. The computer system of claim 8, wherein said list of replaceable components generated by said problem determination procedure is ranked in order of decreasing probability that they caused said problem.

* * * * *